(12) United States Patent
Kiel et al.

(10) Patent No.: US 9,910,760 B2
(45) Date of Patent: Mar. 6, 2018

(54) METHOD AND APPARATUS FOR INTERCEPTION OF SYNCHRONIZATION OBJECTS IN GRAPHICS APPLICATION PROGRAMMING INTERFACES FOR FRAME DEBUGGING

(71) Applicant: NVIDIA Corporation, Santa Clara, CA (US)

(72) Inventors: Jeffrey Kiel, Raleigh, NC (US); Dan Price, Cary, NC (US); Mike Strauss, Durham, NC (US)

(73) Assignee: Nvidia Corporation, Santa Clara, CA (US)

( * ) Notice: Subject to any disclaimer, the term of this patent is extended or adjusted under 35 U.S.C. 154(b) by 82 days.

(21) Appl. No.: 14/845,123

(22) Filed: Sep. 3, 2015

(65) Prior Publication Data

US 2017/0039124 A1 Feb. 9, 2017

Related U.S. Application Data

(60) Provisional application No. 62/202,743, filed on Aug. 7, 2015.

(51) Int. Cl.
*G06F 9/44* (2006.01)
*G06F 11/36* (2006.01)
(Continued)

(52) U.S. Cl.
CPC ............ *G06F 11/362* (2013.01); *G06F 9/526* (2013.01); *G06F 11/3636* (2013.01);
(Continued)

(58) Field of Classification Search
CPC ............ G06F 11/3688; G06F 11/3664; G06F 11/3684; G06F 11/3419; G06F 11/3466; G06F 2201/865; G06F 11/363
See application file for complete search history.

(56) References Cited

U.S. PATENT DOCUMENTS 7,958,497 B1 * 6/2011 Lindo ................. G06F 11/3636
714/799
8,522,000 B2 * 8/2013 Shebanow .............. G06F 9/327
712/225
(Continued)

OTHER PUBLICATIONS

André Alexandre Wang Liu, "3D Application Debugging", Minho's University, Dec. 2014, pp. 1-101; <https://repositorium.sdum.uminho.pt/bitstream/1822/37267/1/eeum_di_dissertacao_pg22841.pdf>.*

(Continued)

*Primary Examiner* — Thuy Dao
*Assistant Examiner* — Ben C Wang

(57) ABSTRACT

An aspect of the present invention proposes a solution for correctly intercepting, capturing, and replaying tasks (such as functions and methods) in an interception layer operating between an application programming interface (API) and the driver of a processor by using synchronization objects such as fences. According to one or more embodiments of the present invention, the application will use what appears to the application to be a single synchronization object to signal (from a processor) and to wait (on a processor), but will actually be two separate synchronization objects in the interception layer. According to one or more embodiments, the solution proposed herein may be implemented as part of an module or tool that works as an interception layer between an application and an API exposed by a device driver of a resource, and allows for an efficient and effective approach to frame-debugging and live capture and replay of function bundles.

22 Claims, 4 Drawing Sheets

(51) Int. Cl.
  *G06F 9/52* (2006.01)
  *G06F 11/34* (2006.01)
(52) U.S. Cl.
  CPC ...... *G06F 11/3419* (2013.01); *G06F 11/3466* (2013.01); *G06F 11/3664* (2013.01); *G06F 11/3688* (2013.01)

(56) References Cited

U.S. PATENT DOCUMENTS

| | | | | |
|---|---|---|---|---|
| 9,195,829 B1* | 11/2015 | Goradia | ................ | G06F 11/362 |
| 9,256,514 B2* | 2/2016 | Kiel | ................ | G06F 11/3636 |
| 9,292,414 B2* | 3/2016 | Kiel | ................ | G06F 11/3664 |
| 9,298,586 B2* | 3/2016 | Sowerby | ................ | G06F 11/3624 |
| 9,477,575 B2* | 10/2016 | Strauss | ................ | G06F 11/362 |
| 2002/0199173 A1* | 12/2002 | Bowen | ................ | G06F 11/3466 717/128 |
| 2008/0114937 A1* | 5/2008 | Reid | ................ | G06F 11/362 711/117 |
| 2010/0211933 A1* | 8/2010 | Kiel | ................ | G06F 11/3636 717/125 |
| 2011/0078427 A1* | 3/2011 | Shebanow | ................ | G06F 9/327 712/244 |
| 2012/0081376 A1* | 4/2012 | Sowerby | ................ | G06F 11/3612 345/522 |
| 2012/0081378 A1* | 4/2012 | Roy | ................ | G06T 15/005 345/522 |
| 2013/0091494 A1* | 4/2013 | Sowerby | ................ | G06F 11/3624 717/129 |
| 2013/0159780 A1* | 6/2013 | Bedwell | ................ | G06F 11/3466 714/45 |
| 2013/0185346 A1* | 7/2013 | Lee | ................ | H04L 67/02 709/201 |
| 2014/0146062 A1* | 5/2014 | Kiel | ................ | G06F 11/3664 345/522 |
| 2014/0168231 A1* | 6/2014 | Allen | ................ | G06T 1/20 345/506 |
| 2014/0189544 A1* | 7/2014 | Everitt | ................ | G06F 9/54 715/760 |
| 2014/0372990 A1* | 12/2014 | Strauss | ................ | G06F 11/362 717/133 |
| 2016/0011955 A1* | 1/2016 | Tsai | ................ | G06F 11/3419 717/128 |

OTHER PUBLICATIONS

William B. Langdon, "Debugging CUDA", ACM, GECCO'11, Jul. 2011, pp. 415-422; <https://dl.acm.org/citation.cfm?id=2002028&CFID=993336535&CFTOKEN=51222302>.*

Podila et al., "A Visualization Tool for 3D Graphics Program Comprehension and Debugging", IEEE, Oct. 2016, pp. 111-115; <http://ieeexplore.ieee.org/stamp/stamp.jsp?tp=&arnumber=7780167>.*

* cited by examiner

Exemplary Computer System 400

METHOD AND APPARATUS FOR INTERCEPTION OF SYNCHRONIZATION OBJECTS IN GRAPHICS APPLICATION PROGRAMMING INTERFACES FOR FRAME DEBUGGING

CLAIM OF PRIORITY

This application claims the benefit of U.S. provisional patent application No. 62/202,743 filed Aug. 7, 2015 to Kiel et al., and which is incorporated herein in its entirety by reference.

BACKGROUND OF THE INVENTION

Debugging is a well-known process for finding the causes of undesirable operations in computer applications and modules. The undesirable operations may include, but are not limited to, unexpected behavior such as extended delays ("freezing"), unintended repetition ("looping"), unintended termination ("crashing"), or problems in the storage and/or manipulation of data, such as data discrepancies, memory faults, or anomalies. Typically the undesirable operations are caused by errors ("bugs") in the application or module software.

In the case of computer graphics applications, the process of debugging may be made more complex by the use of heterogeneous computing systems that include both CPUs and GPUs. Additionally, debugging may be complicated by asynchronous processing on such systems, large datasets, and the need to have visibility into the complex state machines implemented by one or more GPUs. A frame debugger is a tool that allows users to inspect state/data at various points in a set of graphics frames with the intent of uncovering application bugs that produce incorrect rendering or other unintended behavior. Such bugs may be a result of program errors such as improperly configured state, incorrect operations sent to the GPU, corrupt data, or data hazards (often by consuming data before it has been produced). A frame debugger may capture (record) and replay the graphics operations generated by an application to enable such inspection.

The functionality provided by one or more GPUs or graphics systems is exposed using 3D application programming interfaces (APIs). Traditionally the runtimes and drivers that implement such APIs manage the complexity of potential data hazards internally, freeing the application developer from the need to worry about such complexity. A more recent industry practice has shifted the burden of resource management, data hazard management, and operation synchronization across processors to the application. This is done via APIs designed to expose such functionality.

A conventional mechanism for ordering or synchronizing operations with data dependencies across two or more processors (homogenous, heterogeneous, physical, logical, virtual, etc.) is to use synchronization objects or primitives. Such objects allow one processor to communicate with one or more other processors when a workload (set of tasks or operations) has completed. A fence object is an example of such a synchronization primitive. A processor can wait on a fence object, effectively blocking the processor from continuing any work, until the fence is signaled by another processor. A fence typically encapsulates a value that can be observed by processors, allowing the processors or application to make decisions about what workloads to execute based on the current progress made by other processors as indicated by the fence value. These kinds of synchronization primitives are exposed by modern 3D graphics APIs to aid in synchronizing work across CPUs and GPU engines.

Correct programming in a multi-processor environment is inherently complex. A set of bugs arising from incorrect fence usage includes, but is not limited to, data being consumed before it has been produced (no fence used or fence improperly used), less than optimal utilization of processors as a result of unnecessary fence waiting, processor hangs, and application or other system crashes. A graphics frame debugger that does not properly detect and replicate an application's use of fences will, at a minimum, have trouble replaying the application's sequence of events in a consistent and well-ordered way. Additionally, it will not be able to provide feedback to users about potential erroneous fence usage without accurately tracking fence operations.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the present invention proposes a system for correctly intercepting fence operations and detecting the order in which tasks (specified via functions and methods exposed by the API) are executed on one or more processors. According to one or more embodiments of the present invention, what appears to be a single fence to the application is implemented by a frame debugging interception layer as two separate fence objects. These objects are, in turn, implemented by the underlying graphics API. One of these fence objects is known to the frame debugging interception layer as a signaling fence, while the other is known as the waiting fence. Application operations that signal the fence end up operating on the underlying signaling fence, while application operations that observe or wait on the fence end up operating on the waiting fence. The interception layer is responsible for detecting completion of work as indicated by the signaling fence, and propagating this information to the waiting fence.

According to another aspect of the present invention, the system may be extended to provide capabilities for capturing and replaying of tasks for purposes such as frame debugging and the like. For embodiments to perform frame capture and replay, a second pair of synchronization objects is used to accomplish this task. In order to ensure that frame replay takes place in such a way that it honors the time at which a synchronization mechanism lands or completes, artificial function bundles (structures for tracking which functions or methods an application has called to issue graphics work) are inserted into the stream of captured function bundles. These function bundles represent the point at which the interception layer is first made aware that the signal has completed. The function bundles may, for example, instruct the replay system to wait for such synchronization to complete, as function bundles captured after this point may have been ordered according to the synchronization operation. At the beginning and end of each captured frame all unblocked work submitted via the graphics API is forced to complete. This ensures that all signals land as intended.

More specifically, embodiments of the present invention include a method for performing application-based synchronization between two or more processors, in which a plurality of processing tasks are assigned to and performed in a plurality of processors. The method suspends, via usage of a waited synchronization object, a performance of a subsequent plurality of processing tasks until a separate signaling synchronization object is signaled as being completed, and the signal is propagated by an interception layer to the waiting synchronization object. According to such an embodiment, the pair of synchronization objects are created by an interception layer, but appear as a single synchronization object to the application.

According to a second embodiment, a method for performing application-based frame-debugging is also provided, in which two pairs of synchronization objects are used, with the first pair of synchronization objects being used to intercept, capture, and record signals before propagating the signals to the second (interior) pair of synchronization objects, which are used to perform the wait, propagate, and signal functionality described above.

Yet another embodiment includes a system for performing the methods described above that includes a memory device and a plurality of processors, collectively executing the application, drivers of at least one of the plurality of processors, and an interception layer that performs application-based synchronization and frame-debugging.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Figure 1:
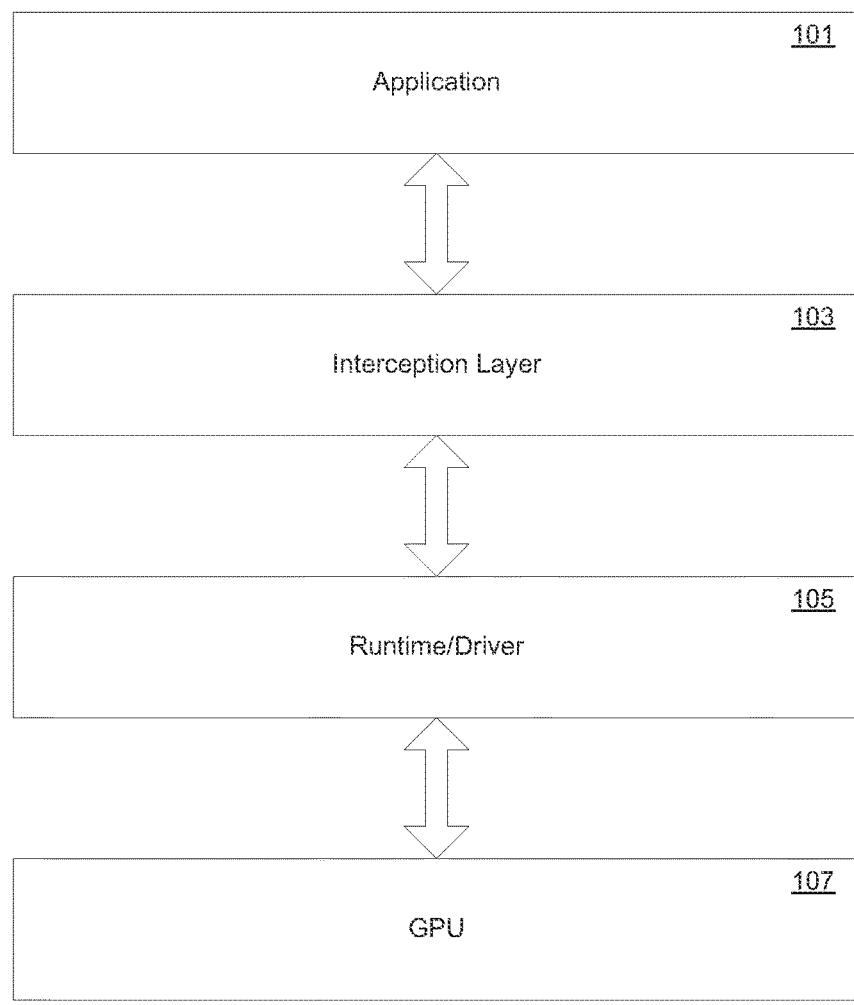
FIG. 1 is a diagram that depicts an exemplary stack configuration for application data flow, in accordance with various aspects of the present invention.

Reference will now be made in detail to the preferred embodiments of the claimed subject matter, a method and system for the use of a computing system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Synchronization Objects

Embodiments of the claimed subject matter are presented to provide a novel system and method for intercepting synchronization operations, such as those that are performed using a fence primitive, and detecting the order in which tasks are executed on one or more processors. Here a processor may be physical, logical, or virtual, a process, thread, or work queue, a CPU or GPU, or other such computer system capable of executing work. Additional aspects of the claimed subject matter may be extended to provide capabilities for capturing and replaying such tasks for the purpose of frame debugging and the like.

FIG. 1 is a diagram that depicts an exemplary configuration of a frame debugger interception stack, in accordance with various aspects of the present invention. As depicted in FIG. 1, an application 101 (executed by, for example, a processor in a computing system) generates and issues graphics commands via functions and methods during operation. In a conventional stack, a runtime and/or driver that implements a graphics API (105) receives such commands, and sends them to the GPU (107). Data can flow from the application level to the GPU and from the GPU to the application; as indicated by the bidirectional dataflow.

According to one or more embodiments, a system containing an interception layer for frame debugging includes an interception layer (103). This layer intercepts commands specified by the application. The interception layer can, among other things, shadow state changes made by the commands, record the commands, forward the commands on to the runtime and/or driver (105), forward modified commands to the runtime and/or driver (105), and issue additional commands to the runtime and/or driver (105).

Figure 2:
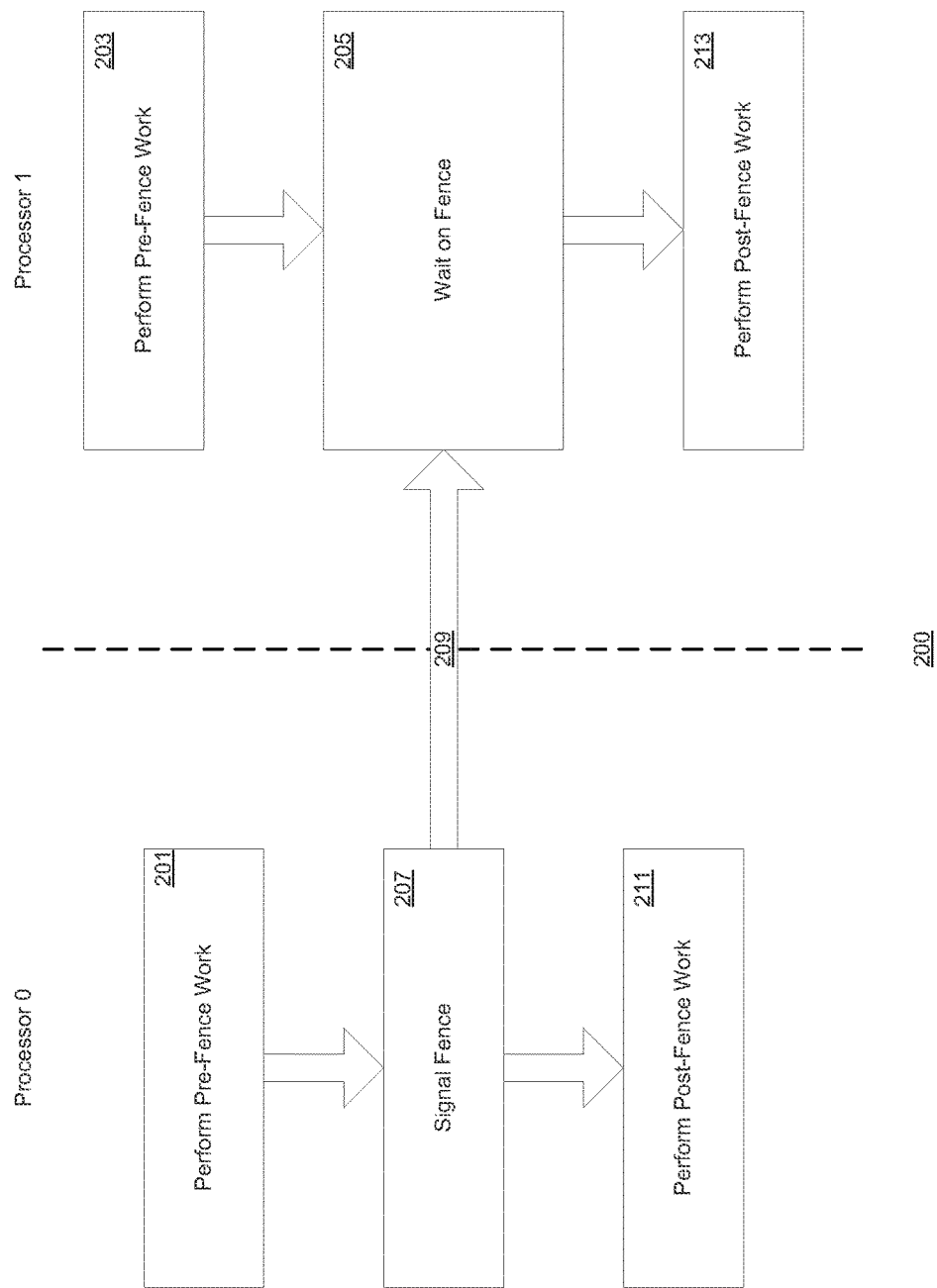
FIG. 2 depicts a flowchart of an exemplary computer-controlled process for performing application-based synchronization between two or more processors with synchronization objects, in accordance with various embodiments of the present invention.

In a non-intercepted system, two or more processors may use a fence or other synchronization primitive to order work as depicted in the process 200 of FIG. 2. In this diagram, processor 0 performs some work (201) before signaling a fence (207) to indicate that the work has been completed. After signaling the fence, processor 0 continues to perform more work (211). Processor 1 has a workload (203) that can be assumed to be independent of any work being done by processor 0 based on the usage of the fence. Processor 1 may execute this workload at any time before, during, or after processor 0 executes (201, 207, or 211). Processor 1 then waits on the fence (205). This blocks processor 1 from doing more work until after processor 0 signals the fence (207), and the signal is made visible to processor 1 (209). Once the signal is visible to processor 1, processor 1 can perform additional work (213) that is, based on the usage of the fence, likely dependent on work performed in (201). The exact timing and nature of how the signal is made visible (209) is typically opaque. This can present problems for a frame debugger interception layer that needs to know the exact timing and ordering of events that are executed on one or more processors.

According to one or more embodiments, a frame debugger interception layer may operate in different modes. In one such embodiment, one mode is known as "running" mode. In running mode the application runs normally, although with all commands being passed through the interception layer. The interception layer may make minor modifications to commands for compatibility or tracking reasons, or to enable the interception layer to expose real-time information to the user. In one such embodiment, a pair of modes known as "capture" mode and "replay" mode implement frame debugging functionality. Frame debugging allows a user to capture one or more frames of graphics commands, and then replay them in a loop. This allows the user to inspect individual graphics commands, and to observe and verify their output with the intent of uncovering the source of application program errors.

In one or more embodiments, capturing graphics commands may be performed by using function bundles. Each function bundle may represent the tokenization or unitization of a function or method call to the 3D graphics API. Such tokenization includes an ID (e.g., a value) that indicates which function or method the command corresponds to, and the parameters used by the function. During capture mode, a function bundle is recorded each time a function or method is called by the application.

According to one or more embodiments, a frame debugger interception layer may respond to an application request to generate (create) a single synchronization object with signaling and waiting capabilities, such as a fence, by creating two fences internal to the interception layer. These fences are used to implement the application's notion of a fence object in running mode. One fence is known as the "signaling" fence and the other is known as the "waiting" fence. This detail is opaque to the application, which sees a single fence as if the interception layer was not in place. When the application issues a command that would signal a fence, the interception layer applies it to the signaling fence. When the application issues a command to monitor or wait on a fence, the interception layer applies it to the waiting fence. When the interception layer sees a signal operation, the interception layer uses available mechanisms from the API to monitor or listen for the fence to complete to the specified value.

According to such embodiments, the signaling fence may have a value that corresponds to the state of progress of a particular processor working on a set of tasks or operations. The waiting fence likewise has a value that corresponds to the state of progress as indicated by the signaling fence and as processed by the interception layer. In one or more embodiments the current state (value) of the application's notion of a fence is based on the interception layer's waiting fence. The current state or value of the application's notion of the fence may include a different value or state that corresponds to the application's notion of the already submitted or assigned tasks to be performed. In such embodiments, the interception layer knows when the signaling fence has completed (reached a certain value). When this happens, the interception layer may do additional work such as data or task verification, logging, consistency checks, or any other similar tasks for the purposes of data analysis and/or frame debugging. Following such operations, the interception layer forwards the signal on to the waiting fence, which allows the application to proceed. Processors waiting on the fence are unblocked.

Figure 3:
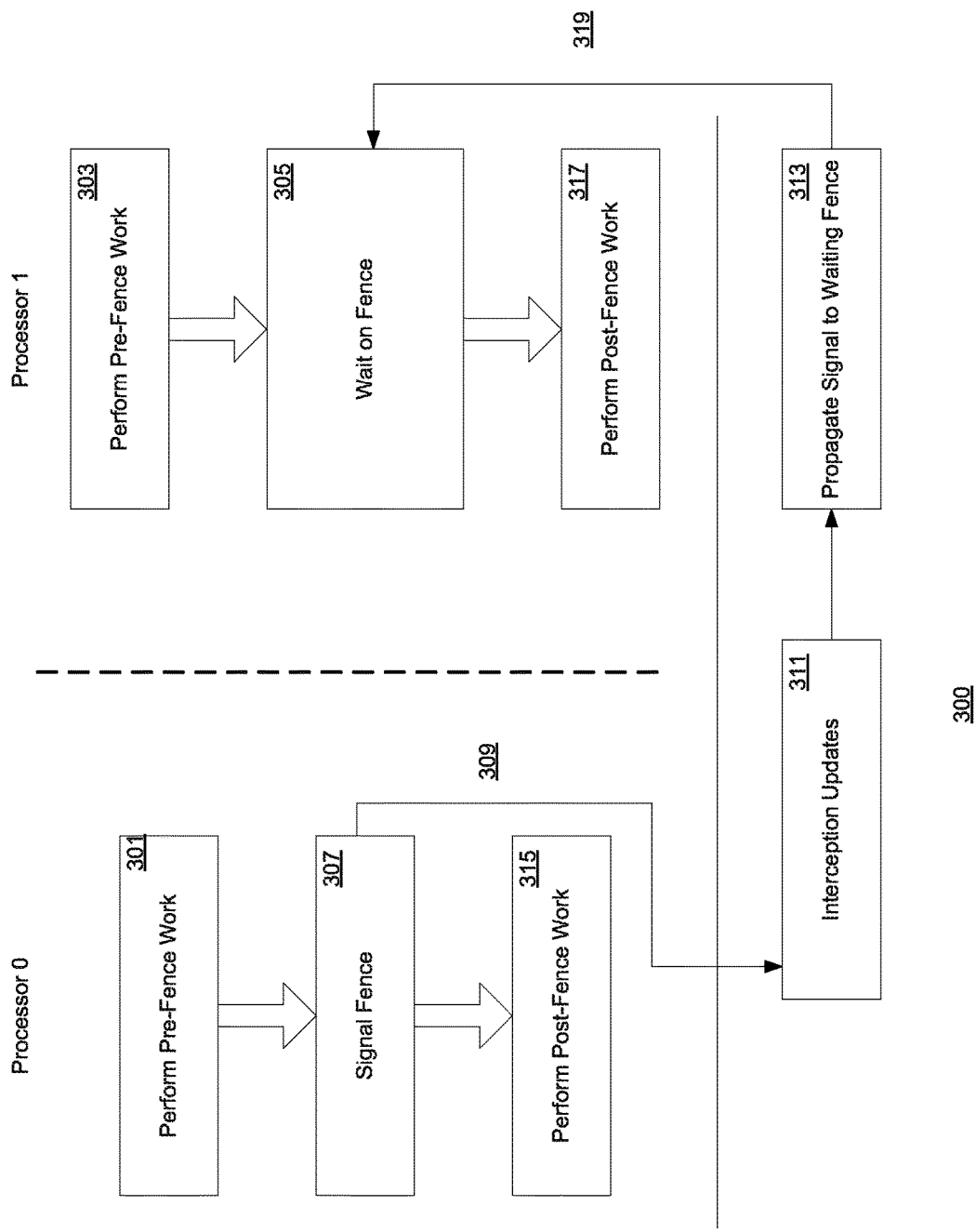
FIG. 3 depicts a flowchart of an exemplary computer-controlled process for performing debugging using paired synchronization objects, in accordance with various aspects of the present invention.

FIG. 3 depicts an alternate approach and describes a process 300 for synchronization object processing. FIG. 3 is similar to FIG. 2, however step 209 has been replaced by steps 309, 311, 313, and 319. Here the signal operation (307) executed by processor 0 happens on the interception layer's signaling fence. The interception layer monitors this fence and receives the signal (309). The interception layer may perform necessary or desired updates (311), and the signal is propagated to the waiting fence (313). The signal on the waiting fence (319) is received by processor 1, unblocking it. Processor 1 is then free to continue executing other work (317).

According to one or more embodiments, the frame debugging process (implemented via capture and replay modes) uses a second pair of fence objects. The pair of fence objects in use while the interception layer is in running mode may be implemented by the underlying runtime/driver in such a way that "replaying" a signal value (i.e. signaling the fence with a previously used value) may lead to incorrect behavior. Also, an application's use of a fence may be incompatible with replaying a signal value. For example, the application may be designed to generate new work when a signal of a given value is received or observed by a processor. The work may only be intended to be generated once. However, if the signal's value is reused repeatedly during replay of a frame, the application may generate multiple unintended workloads. As such, the capture/replay process uses a second pair of fence objects to avoid such incompatibilities. This system provides an interception layer and frame debugger to correctly track the fence usage of an application.

According to one or more embodiments, when the user indicates that the interception layer should enter frame debugging (capture/replay) mode, the interception layer will internally redirect all application fence operations from the running mode signal/wait fence pair to the frame debugging pair. This may require bootstrapping the frame debugging pair by artificially signaling the fences to particular values that reflect the application's current progress. When the user indicates that the interception layer should return to running mode, the interception layer redirects all application fence operations to the original (running mode) pair of fences until the next mode change. The user can transition from running mode to frame debugging mode and back as many times as is desired.

Correct replay of the application's commands as recorded in function bundles may be dependent on detecting when the application has made a decision by observing the value of a fence object. According to one or more embodiments, knowing the order of application specified commands relative to the time that a fence signal completes during capture mode allows the interception layer to maintain this ordering in replay mode. In one or more embodiments, this order is maintained during replay mode by inserting an artificial function bundle into the stream of function bundles at the time the interception layer receives a signal from the signaling fence during capture mode. This is done before propagating the signal to the waiting fence so that any work dependent on the signal will be captured after the artificial function bundle has been captured.

According to one or more embodiments, this application specified behavior will be processed as intended with a two fence implementation in the interception layer. Additionally, when capturing one or more frames of operations, a frame debugger interception layer will be able to correctly capture the order and timing of 1) the application signaling a fence, 2) the associated processor completing the work and the fence signaling or updating its value, 3) application operations that monitor or observe the value of the fence, and 4) application operations that request that a processor wait on a fence. Additionally, depending on the API, the interception layer will be able to properly record the order of operations triggered via callbacks associated with the signaling of a fence.

According to one or more embodiments, the captured application specified behavior can be replayed while maintaining the same order of operations. This is possible because the interception layer knows the order of signal, monitor, and wait operations, in addition to knowing when the fence has actually been signaled. Knowing that the fence has been signaled is possible because the interception layer is always the first layer of software above the driver stack that is aware that a fence signal has completed. The interception layer notifies other layers via propagation of the signal to the waiting fence.

According to one or more embodiments, additional information collected during the frame capture and replay process may be used to detect improper fence usage. Knowledge of resource production and consumption by particular processors allows the frame debugger interception layer to know when synchronization must occur in order to produce correct results. Since the interception layer knows all the details about the application intended synchronization operations, it can determine if there are missing synchronization operations. For example, operations that the application should issue in order to be correct, but that the application is not currently issuing. Such a condition would be an application bug that the frame debugger interception layer is able to report to the user. In the absence of such an automatic detection mechanism, basic display of fence operations and resource operations can inform a user about improper fence usage. Additionally the frame debugger interception layer may detect situations where a fence is used unnecessarily.

Exemplary Computing System

Figure 4:
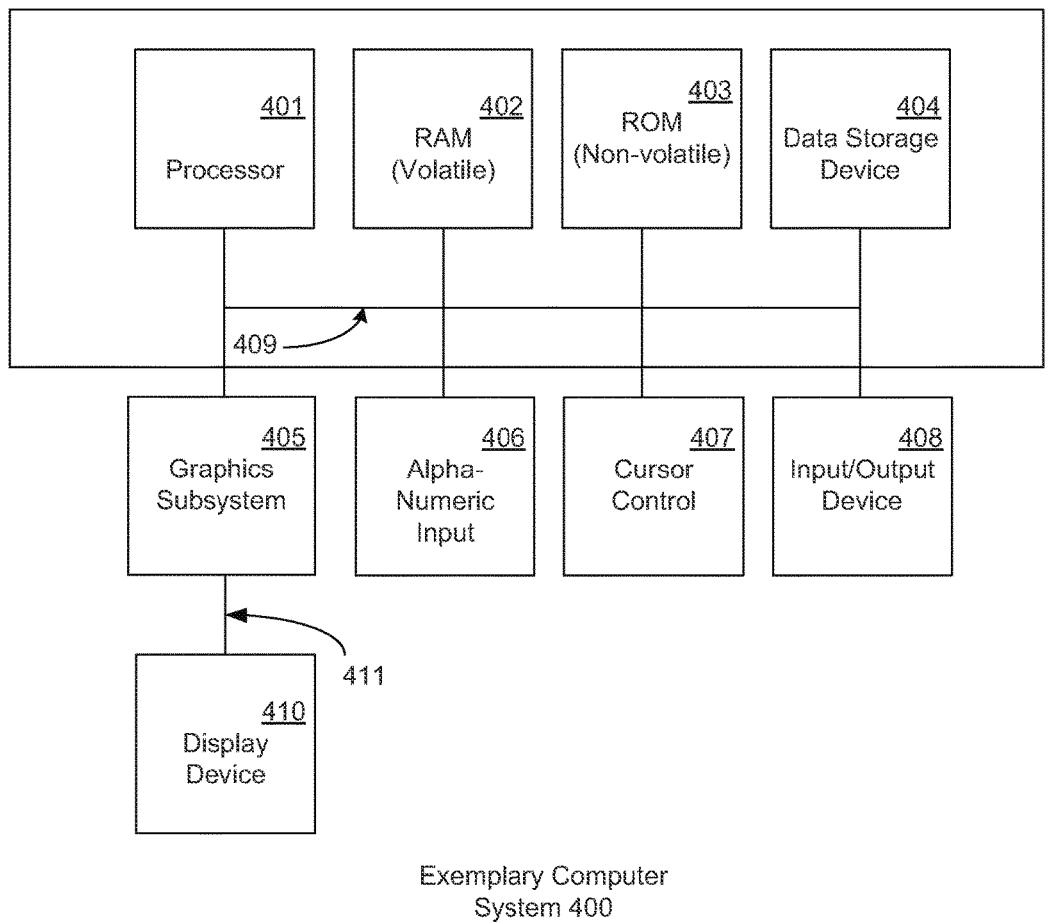
FIG. 4 is a diagram that depicts an exemplary computing system, in accordance with embodiments of the present invention.

As presented in FIG. 4, an exemplary computer system 400 upon which embodiments of the present invention may be implemented (such as the processes 200 and 300 described above) includes a general-purpose computing system environment. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two.

Computer system 400 may also comprise an optional graphics subsystem 405 for presenting information to the computer user, e.g., by displaying information on an attached display device 410. In one embodiment, the processing of one or more tasks (e.g., commands and instructions) of an application executing in computer system 400 may be performed, in whole or in part, by graphics subsystem 405 in conjunction with the processor 401 and memory 402. According to various embodiments of the present invention, a first portion of a plurality of tasks may be assigned by the application to the processor 401, with a second portion of the plurality of tasks being dependent on one or more tasks of the first portion of tasks, and being assigned to be performed by the graphics subsystem 405. In one or more embodiments, the first and second portions are assigned to two or more processors 401, two or more graphics subsystems 405, or any combination thereof.

Additionally, computing system 400 may also have additional features/functionality. For example, computing system 400 may also include additional storage (removable and/or non-removable) including, b t not limited to, magnetic or optical disks or tape. Such additional storage is illustrated in FIG. 4 by data storage device 407. Computer storage media includes volatile and nonvolatile, removable and non-removable media implemented in any method or technology for storage of information such as computer readable instructions, data structures, program modules or other data. RAM 402, ROM 403, and data storage device 407 are all examples of computer storage media.

Computer system 400 also comprises an optional alphanumeric input device 406, an optional cursor control or directing device 407, and one or more signal communication interfaces (input/output devices, e.g., a network interface card) 409. Optional alphanumeric input device 406 can communicate information and command selections to central processor 401. Optional cursor control or directing device 407 is coupled to bus 409 for communicating user input information and command selections to central processor 401. Signal communication interface (input/output device) 409, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Embodiments described herein provide a new approach for performing synchronization of application processing tasks and for performing debugging and data analysis of discretized and tokenized units or function bundles produced during the execution of the processing tasks. Advantages of the invention described herein provide for more efficient parallel processing while still maintaining sequential order and avoiding data hazards by using separate, non-blocking fence primitives.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for performing application-based synchronization between two or more processors, the method comprising:
   in a computing system comprising a plurality of processors, the plurality of processors comprising at least a first processor and a second processor,
   performing, in the first and second processor, a first and second plurality of tasks, respectively, the first and second plurality of tasks being comprised from a sequence of commands issued by an application executing in the computing system;
   suspending, via a waiting synchronization object, a performance of a third plurality of tasks in the second processor when the second plurality of tasks is completed by the second processor;
   signaling a signaling synchronization object when the first plurality of tasks is completed by the first processor;
   propagating a signal from the signaling synchronization object to the waiting synchronization object;
   performing the third plurality of tasks in the second processor based on the propagated signal,
   wherein the waiting synchronization object and the signaling synchronization object are generated in an interception layer and appear as a single synchronization object to the application, the interception layer executing between an Application Programming Interface (API) of the application and a driver of at least one of the first and second processors.

2. The method according to claim 1, wherein the third plurality of tasks comprises at least one task that is dependent on a completion of at least one task of the first plurality of tasks performed by the first processor.

3. The method according to claim 1, wherein the waiting synchronization object and the signaling synchronization object are generated internally in the interception layer in response to a request by the application to create a single synchronization object with both waiting and signaling functionality.

4. The method according to claim 1, wherein the waiting synchronization object comprises a waiting fence object and the signaling synchronization object comprises a signaling fence object.

5. The method according to claim 1, wherein the signaling synchronization object has a value corresponding to a state of a progress of a performance of an assigned plurality of tasks in at least one of the first and second processors.

6. The method according to claim 1, wherein the waiting synchronization object has a value corresponding to a state of a progress of a performance of an assigned plurality of tasks in at least one of the first and second processors as indicated by the signaling synchronization object after processing and propagation by an interception layer.

7. The method according to claim 6, wherein a current state of the performance of the assigned plurality of tasks in the application corresponds to the value of the waiting synchronization layer.

8. The method according to claim 1, wherein an interception layer performs an operation after the signaling synchronization object is signaled but before propagating the signal to the waiting synchronization object.

9. The method according to claim 8, wherein the operation is comprised from a group of operations consisting of:
   data verification;
   task verification;
   data logging;
   data analysis;
   consistency checking; and
   data profiling.

10. The method according to claim 1, further wherein the first processor is operable to perform additional tasks from the plurality of tasks after signaling the signaling synchronization object.

11. A system for frame debugging and synchronization, the system comprising:
    a memory device comprising a plurality of programmed instructions;
    a first processor;
    a second processor;
    an application executing on at least one of the first and second processors based on the programmed instructions, the application using an Application Programming Interface (API); and
    an interception layer operating between the API and a driver of at least one of the first and second processors, the interception layer being configured to: generate a first signaling synchronization object and a separate first waiting synchronization object, to intercept signal commands and wait commands from the application, to apply the signal commands to the first signaling synchronization object and to propagate wait commands to the first waiting synchronization object,
    further wherein the first signaling synchronization object and the first waiting synchronization object appear as a single synchronization object to the application.

12. The system according to claim 11, wherein at least one of the first and second processors is a central processing unit (CPU).

13. The system according to claim 11, wherein at least one of the first and second processors is a graphics processing unit (GPU).

14. The system according to claim 11, wherein the first signaling synchronization object comprises a signaling fence primitive and the first waiting synchronization object comprises a waiting fence primitive.

15. The system according to claim 11, wherein the interception layer is further configured to apply at least one of: a signal operation to the first signaling synchronization object, a query operation to the first waiting synchronization object, and a wait operation to the first waiting synchronization object, based on a command from the application.

16. The system according to claim 11, further comprising:
    a first value corresponding to a state of progress of the application in submitting the first and second plurality of tasks to be performed by the first and second processors;
    a second value corresponding to a value of the first signaling synchronization object;
    a second value corresponding to the first waiting synchronization object;
    and a third value corresponding to the state of progress perceived by the application for performed tasks of the first and second plurality of tasks.

17. The system according to claim 16, further wherein the first value is indicative of a state of progress of a performance of a plurality of tasks in at least one of the first and second processors, the second value corresponds to the state of progress indicated by the first value and propagated by the interception layer to the first waiting synchronization object, and the third value corresponds to a state of progress of the performance of the plurality of tasks as perceived by the application and is based on the second value.

18. The system according to claim 11, wherein the interception layer is further configured to generate a second signaling synchronization object and a second waiting synchronization object, and to record a plurality of parameters and a state of a performance of a plurality of tasks by redirecting commands intended for the first signaling synchronization object to the second signaling synchronization object and commands intended for the first waiting synchronization object to the second waiting synchronization object.

19. The system according to claim 18, wherein the interception layer is further configured to replay the recorded plurality of parameters and the state of the plurality of tasks based on user input.

20. A method for performing application-based frame debugging, the method comprising:
   in a computing system comprising a first processor and a second processor,
   generating a first pair of synchronization objects and a second pair of synchronization objects, the first pair of synchronization objects comprising a first signaling synchronization object and a first waiting synchronization object, the second pair of synchronization objects comprising a second signaling synchronization object and a second waiting synchronization object;
   performing a first portion of a plurality of tasks in the first and second processors using the first pair of synchronization objects to ensure an order of the performance of the first portion of the plurality of tasks;
   entering a frame debugging mode based on user input;
   performing a second portion of a plurality of tasks in the first and second processors using the second pair of synchronization objects to ensure an order of the performance of the second portion of the plurality of tasks by redirecting signal commands intended for the first signaling synchronization object to the second signaling synchronization object and propagating the redirected signal commands intended for the first waiting synchronization object to the second waiting synchronization object;
   recording a state of the application and a plurality of parameters between signal commands intended for the first signaling synchronization object are redirected to the second signaling synchronization object and propagating the wait commands intended for the first waiting synchronization object to the second waiting synchronization object; and
   exiting the frame debugging mode based on user input,
   wherein the first and second pairs of synchronization objects are generated in an interception layer.

21. The method according to claim 19, wherein the recording a state of the application and a plurality of parameters comprises:
   replaying the recording in response to a received user input.

22. The method according to claim 19, wherein the recording a state of the application and a plurality of parameters comprises at least one operation from the group of operations consisting of:
   analyzing a performance of the first plurality of tasks;
   generating a profile based on the analyzed performance;
   outputting the profile based on user input;
   determining an absence of a synchronization operation; and
   determining a presence of unnecessary synchronization operations.

* * * * *